Oct. 16, 1934.   G. J. ORFANSON   1,977,011
FRUIT JUICE EXTRACTOR
Filed Nov. 20, 1930   4 Sheets-Sheet 4
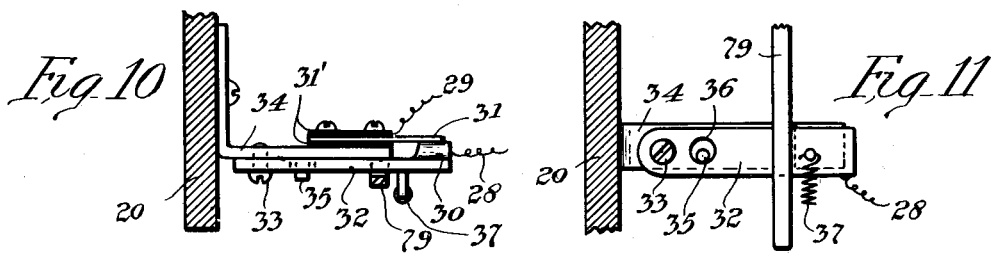
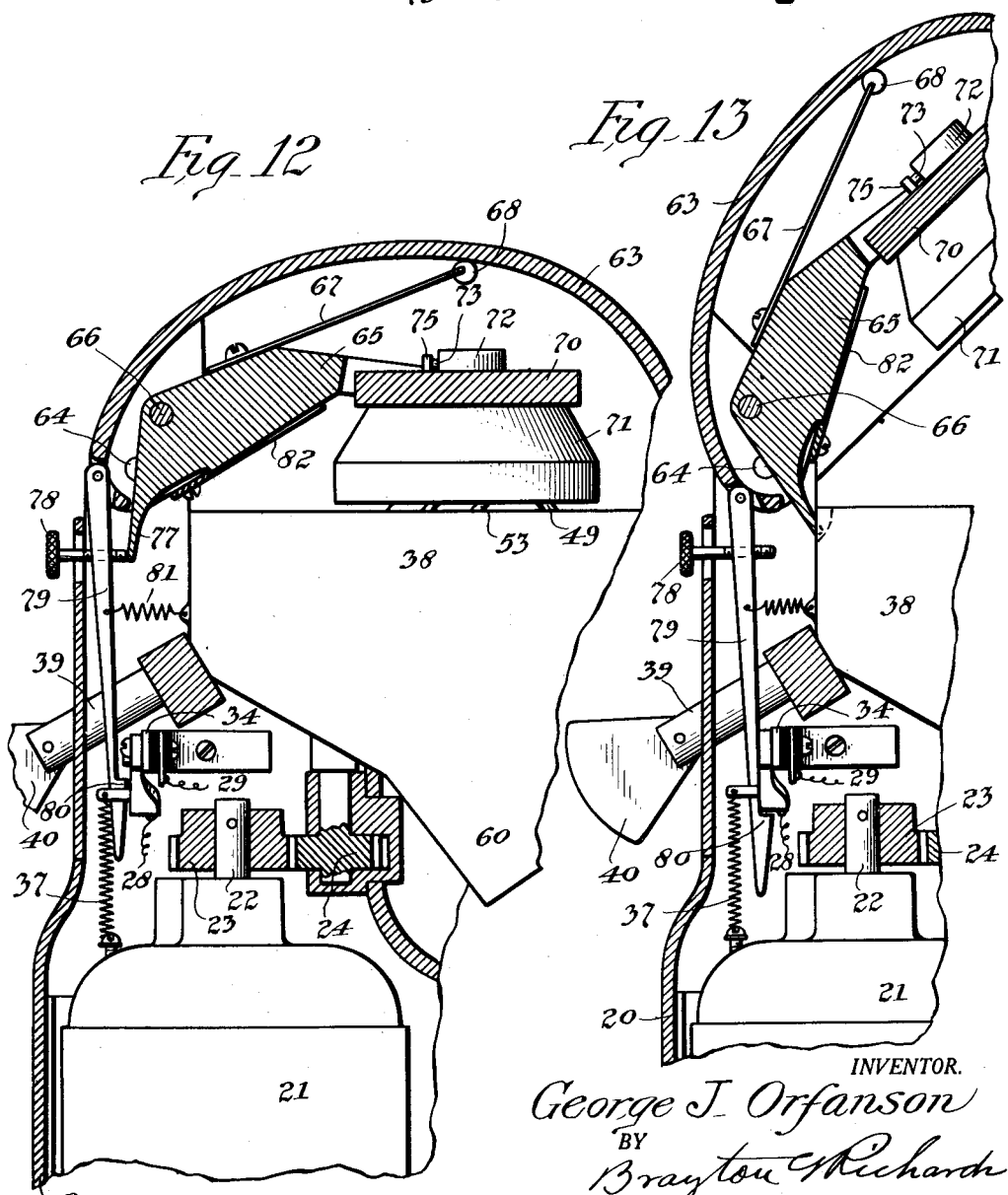
INVENTOR.
George J. Orfanson
BY
Brayton Richards
ATTORNEY.

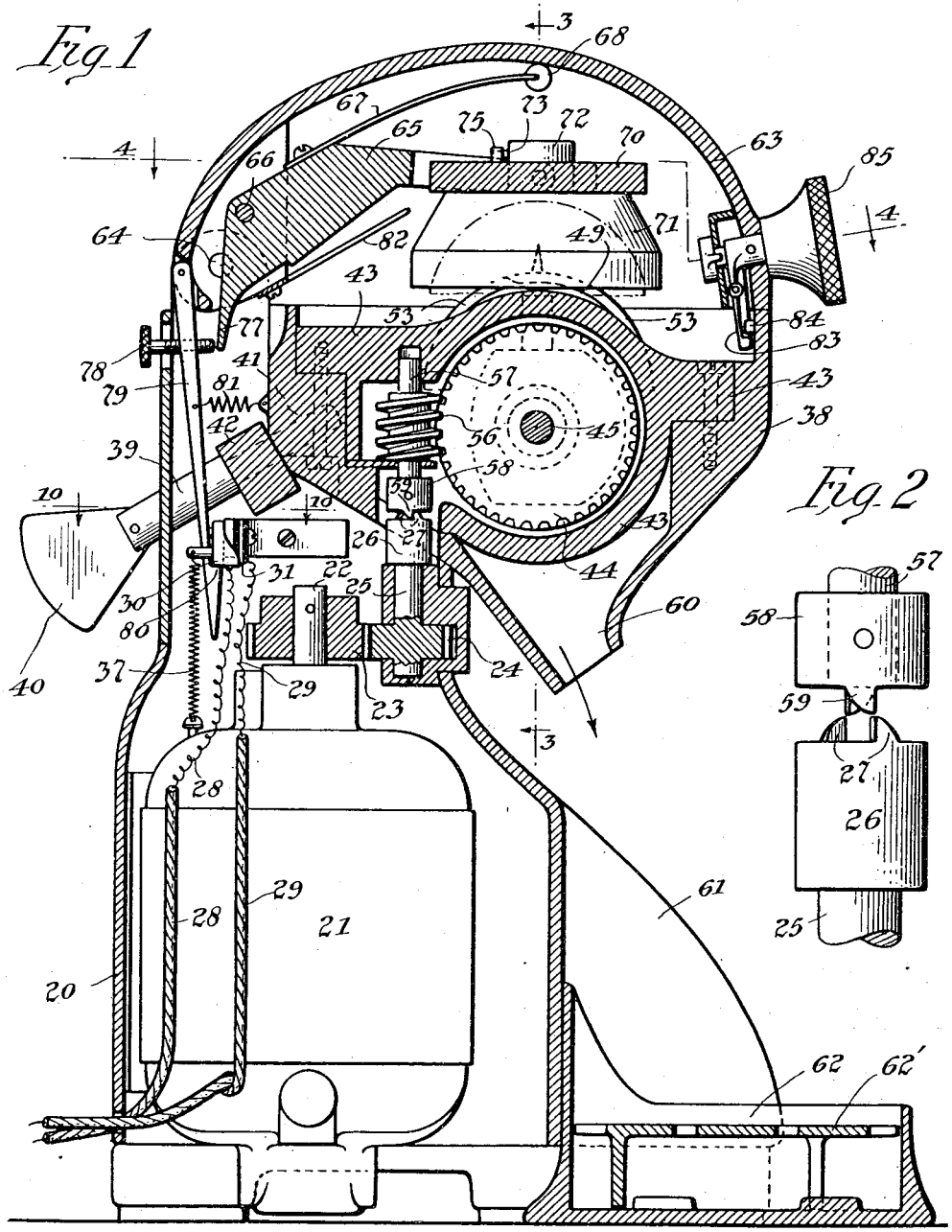

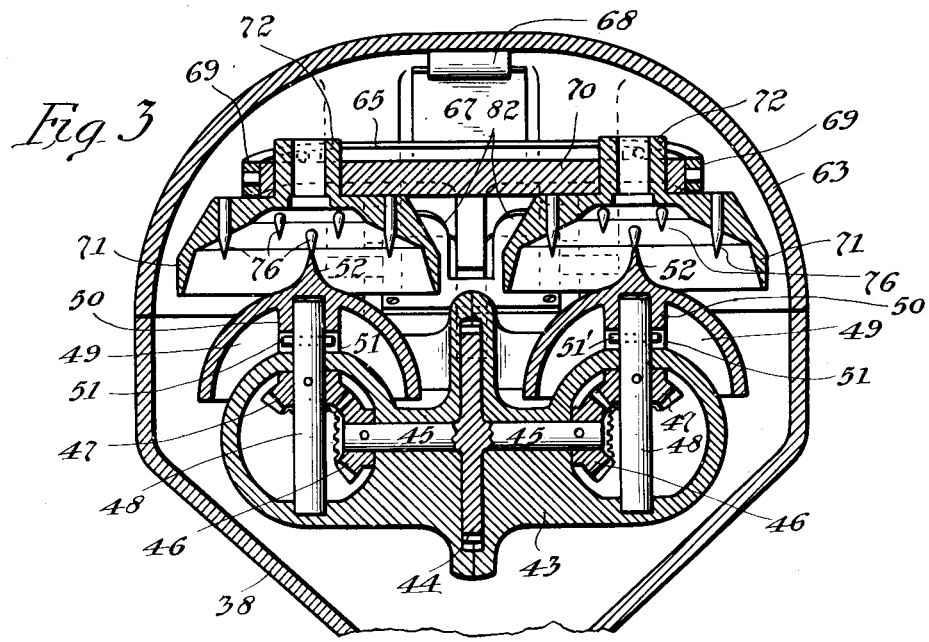
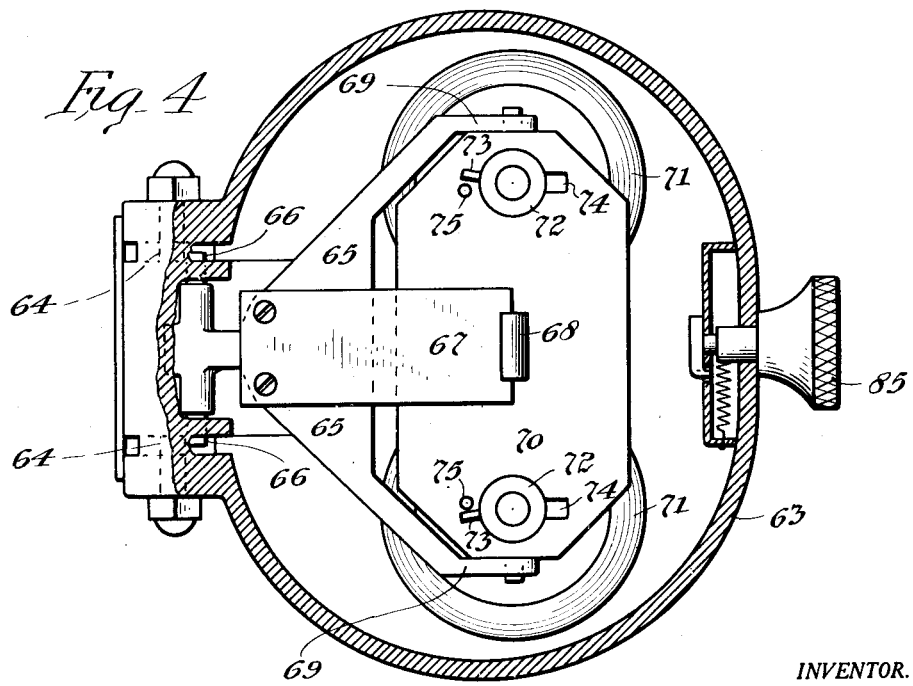

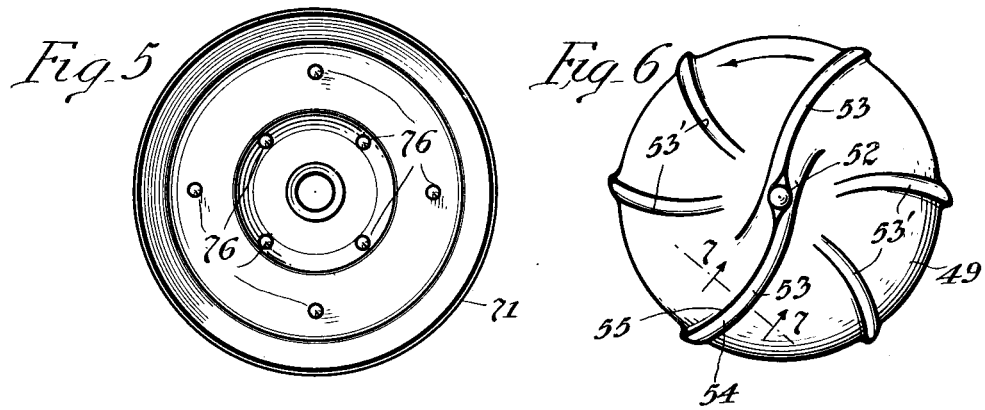
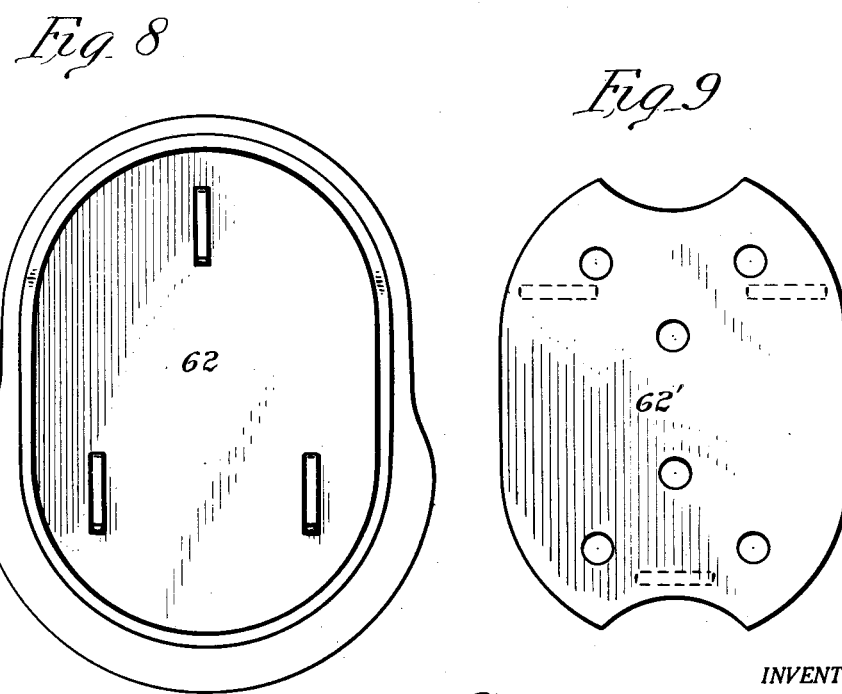

Patented Oct. 16, 1934

1,977,011

UNITED STATES PATENT OFFICE 1,977,011

FRUIT JUICE EXTRACTOR

George J. Orfanson, Chicago, Ill., assignor to Thomas P. Astrinidis, Thomas Kalimeris, and Peter Theodorou, all of Chicago, Ill.

Application November 20, 1930, Serial No. 496,914

10 Claims. (Cl. 146—3)

The invention relates to improvements in fruit juice extractors especially adapted for extracting or expressing the juice from oranges, lemons, grapefruit and the like, the primary object of the invention being to provide a simple, efficient and sanitary apparatus for this purpose.

Another object of the invention is the provision of an improved device of the character indicated having automatic means for controlling the operation thereof.

Another object of the invention is the provision of a device of the character indicated provided with improved reamers adapted and arranged to express or remove the juice from the fruit in a clear and natural condition and without material quantities of the pulp or other solid matter of the fruit contained therein.

Other objects will appear hereinafter.

The invention consists in the combinations and arrangements of parts hereinafter described and claimed.

The invention will be best understood by reference to the accompanying drawings, in which Fig. 1 is a vertical transverse section of a fruit juice extractor embodying the invention;

Fig. 2 an enlarged detail view of a clutch mechanism employed in the device;

Fig. 3 a section taken substantially on line 3—3 of Fig. 1;

Fig. 4 a section taken substantially on line 4—4 of Fig. 1;

Fig. 5 an enlarged bottom-plan view of one of two holding members employed in the construction;

Fig. 6 an enlarged top-plan view of one of two reamers employed in the construction;

Fig. 7 a section taken substantially on line 7—7 of Fig. 6;

Fig. 8 a top-plan view of a stand for a glass or the like for receiving the extracted juice;

Fig. 9 a top-plan view of a support arranged in said stand;

Fig. 10 an enlarged section taken substantially on line 10—10 of Fig. 1;

Fig. 11 a side view corresponding with Fig. 10;

Fig. 12 a partial transverse section through the upper portion of the device and showing the positions of the parts just prior to the automatic stopping of operation thereof; and Fig. 13 a similar partial view showing the positions of the parts when the operation of the device has been automatically discontinued and the cover thereof raised.

The embodiment of the invention illustrated in the drawings comprises a suitable casing 20 having an electric motor 21 mounted therein with its operating shaft 22 projecting vertically from the top of the casing thereof. The motor shaft 22 carries a pinion 23 meshing with a pinion 24 on a vertical counter-shaft 25 mounted at the top of the casing 20, as indicated. The counter-shaft 25 is provided at its top with a clutch head 26 having clutch teeth 27 mounted on the top thereof for connection with the operating parts of the device.

Current is supplied through the electric motor 21 through a suitable electric circuit including wires 28 and 29, as best shown in Fig. 1. The wire 28 is connected with one switch contact member 30 and the wire 29 is connected with another switch contact member 31. The switch contact member 30 is carried by a swinging lever 32 pivoted at 33 on a bracket 34, mounted on the rear wall of the casing 20. The lever 32 is capable of limited vertical swinging movements which are limited by the action of a stop pin 35 on the bracket 34 and passing through an enlarged opening 36, as best shown in Fig. 11. The switch contact 30 is normally held in depressed position by means of a tension spring 37, as best shown in Figs. 1 and 11. As best shown in Fig. 10, the switch contact member 31 is rigidly mounted on the bracket 34 between two plates 31' of insulating material. By this arrangement, when the switch contact 30 is in its normal depressed position, the electric circuit for the motor 21 will be broken but when the switch contact 30 is elevated to bring the same into co-operative contact with the switch contact member 31, the circuit through the motor 21 will be closed and said motor operated to rotate the counter-shaft 25, as will be readily understood.

A juice bowl 38 rests normally upon the upper portion of the casing 20 and is releasably held in position thereon by means of a binding screw 39 projecting through the rear wall of the casing 20 and equipped with a thumb piece 40, as shown. The binding screw 39 is provided with a reduced threaded extension 41 passing freely through a suitable opening in a cross bar 42 of the casing 20, said threaded extension 41 having threaded engagement with the rear portion of the bowl 38, as shown, and whereby the said bowl may be readily removed or replaced for cleaning or other purposes. A gear casing 43 is removably mounted, as indicated, within the bowl 38. Within the gear casing 43 is arranged a central worm wheel 44 carrying lateral shafts 45 equipped at their ends with bevel gears 46 meshing with bevel gears 47 on vertical reamer shafts 48 mounted as best shown in Fig. 3 in the sides of the gear casing 43. At their upper ends, reamer shafts 48 carry dome-like reamers 49 provided with hubs 50 fitting loosely over the upper ends of the shafts 48 and provided with notches 51 engaging cross pins 51' in said shafts, and whereby said reamers 49 will be detachably mounted on the tops of the reamer shafts 48 and will rotate therewith. Each of the reamers 49 is provided with an upstanding, central, co-axial impaling pin 52 and with rearwardly curved juice extracting ribs 53 and 53' on the peripheries thereof. The juice expressing ribs 53 and 53' are provided with abrupt forward edges 54 and inclined rearward edges 55, as best shown in Fig. 7. The reamers 49 are identical in form and construction except that the ribs 53 and 53' are oppositely arranged on each so that the ribs on each are rearwardly curved with reference to the direction of rotation and the abrupt sides 54 of the ribs are arranged on the forward sides thereof with reference to the direction of rotation. The gearing arrangement is such that the reamers 49 will be rotated in opposite directions at moderate speed.

The worm wheel 44 meshes with a worm 56 on a vertical shaft 57 mounted in the rear portion of the gear casing 43 and having limited vertical movement therein, as best shown in Fig. 1. At its lower end the shaft 57 carries a clutch head 58 having clutch teeth 59 adapted and arranged to engage with the clutch teeth 27 on the clutch head 26 on the top of counter-shaft 25. The arrangement is such that the juice bowl 38 may be readily attached or removed and the clutch means 58 and 27 will automatically engage to connect the gearing, the vertical movement of shaft 57 facilitating such automatic engagement as will be readily understood. In this way the juice bowl 38 may be readily removed and replaced for cleaning or other purpose.

The juice bowl 38 is provided at its central bottom portion with a discharge spout 60 and forwardly extending ribs or flanges 61 are formed on the casing 20 to form a recess for the reception of a stand 62 having a removable glass support 62' therein. This arrangement is such that a glass or similar vessel may be conveniently positioned under the spout 60 to receive the juice extracted by the reamers 49.

The casing 20 is equipped with an upwardly swinging dome-like cover member 63 pivoted at 64 to the top of said casing and adapted and arranged to enclose and cover the juice bowl 38, as best shown in Fig. 1. Arranged within the cover member 63 is a compressing arm 65 pivoted at 66 and carrying a leaf spring 67 having a roller 68 at its free end running against the underside of the cover 63 and thereby tending to hold the compressing arm 65 in its lowermost or depressed position. The compressing arm 65 is provided with divergent supporting arms 69 and the holder head or block 70 is tiltably mounted as shown between said arms. A pair of cup-like holder members 71 is detachably mounted on the underside of the head 70. To this end each of the holder members 71 is provided with a central hub 72 carrying a lateral stop pin 73 adapted and arranged to pass upwardly through suitable openings in the head 70, said openings being provided with a lateral extension 74 for the accommodation of the pins 73. Stop pins 75 are provided on the head 70 to limit the rotation of the hubs 72. By this arrangement it will be observed that the holder members 71 may be readily mounted in position by inserting their hubs through the openings in the head 70, the stop pins 75 limiting the extent of rotation and thereby releasably holding said holder members in place, as will be readily understood. Each of the holder members 71 is provided with a plurality of impaling pins 76 adapted and arranged to impale and hold the half of an orange or the like therein. By this arrangement it will be noted that when the half of an orange, or the like, is placed upon each of the reamers 49 and the cover 63 closed, the holder member 71 will be brought into co-operative relation with the orange halves to hold them against rotation and yieldingly press them downwardly upon said reamers.

The compressing arm 65 is provided with a depending tripping finger 77, as best shown in Fig. 1, said tripping finger being arranged in co-operative relation with the set screw 78 carried by a detent 79 pivotally mounted on the rear portion of the cover 63 and having a shoulder 80 at its lower end adapted and arranged to engage under the lever 32 and raise said lever to close the motor circuit when the cover member 63 is closed, as best shown in Fig. 1. The detent 79 is normally held in co-operative relationship with the lever 32 by means of a tension spring 81. A combined guard and stop member 82 is secured as shown in the cover member to limit the downward swing or movement of the compressing arm 65 and protect the parts behind the same. By this arrangement it will be noted that when the cover 63 is closed and the reamers 49 started in their operations, as explained above, the spring 67 will be flexed or bowed and tend to press the orange halves yieldingly downwardly on the reamers 49. As the juice is extracted from the orange halves, the thickness thereof is decreased until this thickness becomes substantially the thickness of the skins of the oranges, the pulp and inner membranes of the orange occupying but little space when the juice is extracted. When this condition has been reached and all the juice extracted, the tripping finger 77 comes in contact with the set screw 78 and the detent 79 is withdrawn from engagement with the lever 32, thereby releasing the switch contact 30 and permitting its withdrawal from contact with the contact 31 thereby breaking the motor circuit and stopping the action of the reamers. Obviously, the juice extracted will pass downwardly through the bowl 38 and out through the spout 60 into a glass or other receptacle placed upon the stand 62. In this manner the juice from halves of oranges, or the like, placed upon the reamers 49 will be automatically and quickly extracted and the working parts of the device automatically stopped when said juice is extracted.

The cover 63 is provided with a spring latch 83 adapted and arranged to automatically engage a pin 84 on the juice bowl 38 when the cover 63 is lowered into closing position. A finger knob 85 is also provided for releasing the latch 83 when it is desired to open the cover 63 for access to the reamers 49.

The particular device illustrated in the drawings is for the purpose of extracting or expressing the juice from oranges or the like. In use the oranges are first cut in half and one-half impaled upon each of the reamers 49. Then the cover 63 of the device is closed thus starting the automatic action of the reamers 49. When the juice has been thoroughly extracted, the action of the reamers will be automatically stopped or discontinued by the automatic action of the tripping finger 77 on the compressing arm 65, as explained above.

In this way the juice from the fruit will be extracted in an absolutely sanitary way and condition, owing to the fact that the working parts are always covered so that no flies, dust or dirt has access thereto. It is also to be noted that a minimum amount of handling of the fruit is necessary and that there will, therefore, be no contamination from this source. The specific form and arrangement of parts is a simple and efficient one for the purpose.

While I have illustrated and described the preferred form of construction for carrying my invention into effect, this is capable of variation and modification without departing from the spirit of the invention. I therefore, do not wish to be limited to the precise details of construction set forth but desire to avail myself of such variations and modifications as come within the scope of the appended claims.

I claim:

1. A device of the class described comprising a dome-like reamer member having rearwardly curved juice expressing ribs on its periphery; a cup-like holding member co-operating therewith and having impaling pins therein; means for effecting relative rotation between said members; means for causing said members to approach each other during operation; and means automatically operating upon near approach of said members for stopping said relative rotation.

2. A device of the class described comprising a pair of rotatable reamers; a pair of spring-held yieldable holders arranged to co-operate with said reamers and normally approach the reamers during operation; means for rotating said reamers in opposite directions; and means automatically operating upon near approach of said holders to said reamers for stopping the rotation of said reamers.

3. A device of the class described comprising a pair of rotatable dome-like reamers having rearwardly curved juice expressing ribs on their peripheries; a pair of spring-held cup-like holders arranged to co-operate with said reamers and normally approach the reamers during operation and having impaling pins therein; means for rotating said reamers in opposite directions; and means automatically operating upon near approach of said holders to said reamers for stopping the rotation of said reamers.

4. A device of the class described comprising a pair of rotatable reamers; an electric motor geared to rotate said reamers in opposite directions; an electric circuit for said motor; a yieldable spring-pressed compressing arm arranged to approach and recede from said reamers, a pair of holding members mounted on said arm and co-operating with said reamers; means for locking said arm in position to bring said holding members into co-operative relationship with said reamers; and means controlled by said arm for first closing said motor circuit and then opening the same.

5. A device of the class described comprising a pair of rotatable dome-like reamers having rearwardly curved juice expressing ribs on their peripheries; an electric motor geared to rotate said reamers in opposite directions; an electric circuit for said motor; a yieldable spring-pressed compressing arm arranged to approach and recede from said reamers; a pair of cup-like holding members tiltably mounted on said arm and co-operating with said reamers; impaling pins in said holding members; means for locking said arm in position to bring said holding members into co-operative relationship with said reamers; and means controlled by said arm for first closing said motor circuit and then opening the same.

6. A device of the class described comprising a casing; an electric motor in said casing; an electric circuit for said motor; a normally open spring-held switch for said circuit; a juice bowl mounted on said casing and having a discharge spout at its bottom; an upwardly swinging cover member for said bowl; a detent carried by said cover member and engaging said switch to close it when said cover is closed; a reamer in said bowl; a readily detachable gearing connection between said reamer and said motor for rotating the former; a yielding spring-held compressing arm in said cover arranged to trip said detent when moved by its spring to the limit of its movement; a holding member on said compressing arm and co-operating with said reamer; and a releasable latch for holding said cover member closed.

7. A device of the class described comprising a casing; an electric motor in said casing; an electric circuit for said motor; a normally open spring-held switch for said circuit; a juice bowl removably mounted on said casing and having a discharge spout at its bottom; an upwardly swinging cover member for said bowl; a detent carried by said cover member and engaging said switch to close it when said cover is closed; a dome-like reamer in said bowl and having rearwardly curved juice expressing ribs on its periphery, a readily detachable gearing connection between said reamer and said motor for rotating the former; a yieldable spring-held compressing arm in said cover arranged to trip said detent when moved by its spring to the limit of its movement; a cup-like holding member on said compressing arm and co-operating with said reamer; impaling pins in said holding member; and a releasable latch for holding said cover member closed.

8. A device of the class described comprising a casing; an electric motor in said casing; an electric circuit for said motor; a normally open spring-held switch for said circuit; a juice bowl removably mounted on said casing and having a discharge spout at its bottom; an upwardly swinging cover member for said bowl; a detent carried by said cover member and engaging said switch to close it when said cover is closed; a pair of reamers in said bowl; a readily detachable gearing connection between said reamers and said motor for rotating the former in opposite directions; a yieldable spring-held compressing arm in said cover arranged to trip said detent when moved by its spring to the limit of its movement; a pair of holding members on said compressing arm and co-operating with said reamers; and a releasable latch for holding said cover member closed.

9. A device of the class described comprising a casing; an electric motor in said casing; an electric circuit for said motor; a normally open spring-held switch for said circuit; a juice bowl removably mounted on said casing and having a discharge spout at its bottom; an upwardly swinging cover member for said bowl; a detent carried by said cover member and engaging said switch to close it when said cover is closed; a pair of dome-like reamers in said bowl and having rearwardly curved juice expressing ribs on their peripheries; a readily detachable gearing connection between said reamers for rotating the former in opposite directions; a yielding spring-held compressing arm in said cover and arranged to trip said detent when moved by its spring to the limit of its movement; a pair of cup-like holding members tiltably mounted on said compressing arm and co-operating with said reamers; impaling pins in said holding members; and a releasable latch for holding said cover member closed.

10. A device of the class described comprising a casing; juice expressing means in said casing; an openable cover for said casing; yieldable spring-held holding means in said cover arranged to approach said expressing means during operation; means operable by closing said cover for starting said expressing means; and means operable by the spring induced operation of said holding means for stopping said expressing means.

GEORGE J. ORFANSON.